Oct. 8, 1968     H. BRACHVOGEL ETAL     3,404,934
ORTHOSCOPIC PANORAMIC AND STRAIGHT-VIEW OPTICAL SYSTEM
Filed Oct. 28, 1963
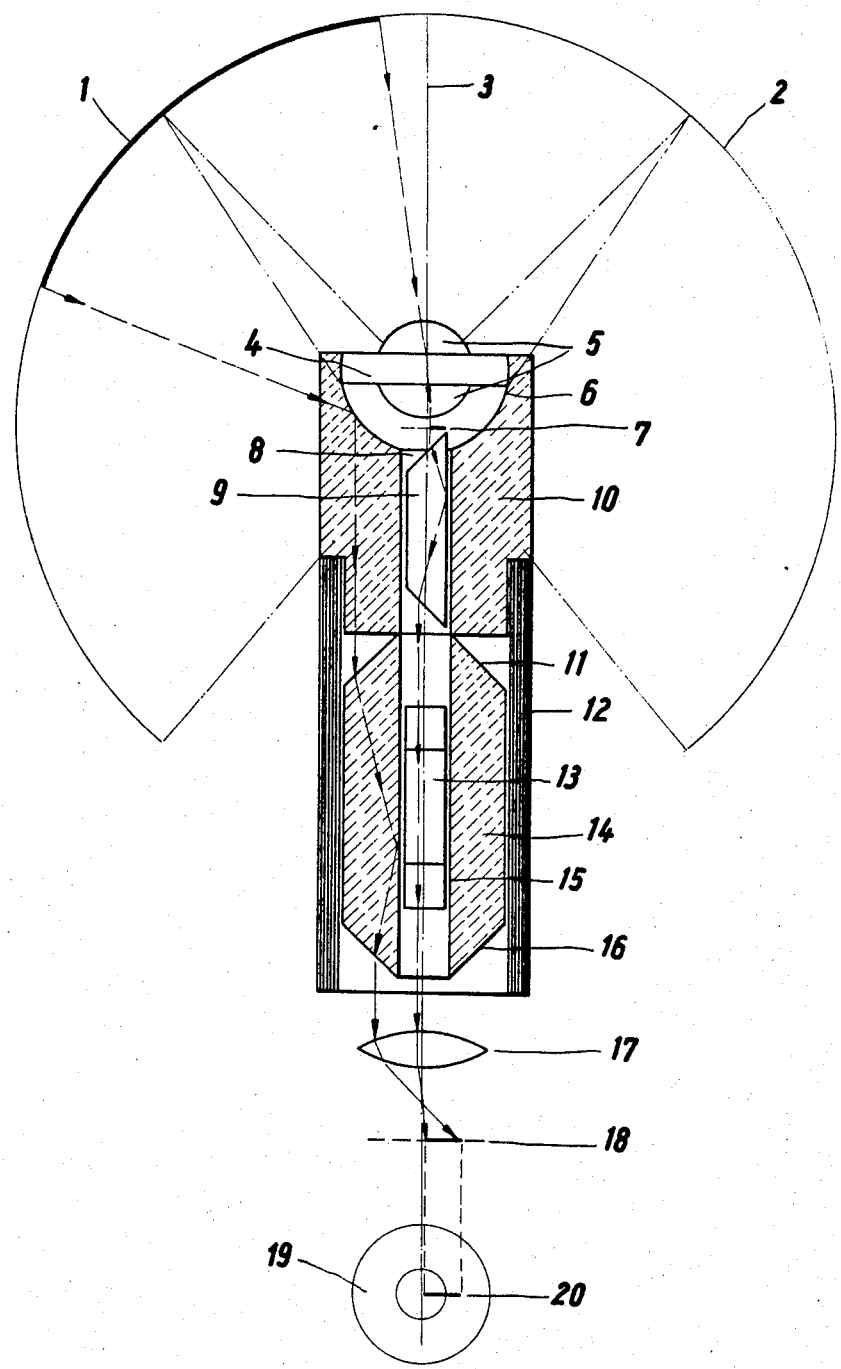
Inventor:

3,404,934
ORTHOSCOPIC PANORAMIC AND STRAIGHT-
VIEW OPTICAL SYSTEM
Heinz Brachvogel, Aubundt 750, Vaduz, Liechtenstein,
and Gerhard Pickroth, Rossfeldstrasse 16, Schaan,
Liechtenstein
Filed Oct. 28, 1963, Ser. No. 319,163
Claims priority, application Austria, Oct. 31, 1962,
A 8,589/62
10 Claims. (Cl. 350—198)

For endoscopical purposes, panoramic optical systems have already been used which enable with the aid of mirrors a production of images with correct illumination and have spherical optical means to provide for a straight view. These optical elements produce separate, independent images, which have necessarily different relative positions. For this reason, each image had to be individually analyzed. This required a visual change and a change in the mental approach and may be a reason for error. It is an object of the optical system described hereinbefore to avoid such errors.

The image-producing elements consisting of a panoramic mirror and straight-view optical means are suitably combined in a closed body and the lens system of the straightview optical means closes the panoramic optical body like a cover. The cylindrical glass body has a through bore extending along its longitudinal axis and eliminating the viewer's position from the picture so as to enable a straight view in forward, upward etc. directions.

It is initially necessary to adjust the straightview optical means to the correct viewing position. The use of an erecting lens system behind the straight-view optical means would result in a longer focal length so that the image plane of the straight-view optical means could not be included in the virtual image of the panoramic mirror. For this reason, the image is erected by a prism arrangement.

Whereas it is known to use inverting prisms in endoscopic instruments, such prisms enable the use of the instrument only in one definite viewing position or in selected viewing positions indicated by marks because a rotation of the endoscope through 45° will turn the image through 90°, which results in a change of the apparent positions during viewing. This rotation of the image may be eliminated with Porro prisms, as are used in prism telescopes. Porro prisms cannot be incorporated in the through bore, however, because the space available is too small.

To solve these difficulties, the invention teaches to provide two inverting prisms which are arranged in series and the reflecting bases of which are at an angle of 90° to each other. This will eliminate the rotation of the image caused by the first inverting prism when the panoramic optical system is rotated and an inversion of the image by 180° is obtained in conjunction with a correct position of the sides in any position of the instrument.

The first inverting prism is suitably cemented in the bore of the panoramic optical body and the second prism is incorporated in the bore of a preferably tubular inverting prism succeeding in the path of rays. The arrangement of the second prism is such that its reflecting base is at an angle of 90° to the base of the first prism.

The optical inverting element (14) for the panoramic view may be a tubular prism because the inside surface of the tube may be polished and mirror-coated to act as a reflecting base of an inverting prism. The refracting faces are ground and polished conical surfaces at 45°. This tubular inverting prism gives the annular image of the panoramic optical means a side-inverted, correct position.

The entire orthoscopic panoramic optical system produces an erect continuous image, with correct side orientation and with an angle of 360° in a horizontal plane, providing for a roundabout view, and a vertical angle of view of about 300°, in the form of a closed circular image, at the center of which the zenith is disposed.

The invention will be explained with reference to an illustrative embodiment. The panoramic optical body 10 is closed by a cover consisting of straight-view optical element, which comprises the lenses 5 and the interposed plate 4. The body 10 consists of optical glass and is cylindrical. The optical axis of symmetry 3 extends at the center of the body 10 throughout the system. The panoramic mirror 6 may be spherical or aspherical and is disposed below the closing cover 4. The image plane of the straight-view optical element is included approximately at 7 in the virtual image produced by this morror.

The system has a through bore in the direction of the optical axis 3. The bore 8 of the panoramic optical body 10 accommodates a first inverting prism 9. The second inverting prism 13 is disposed at an angle of 90° relative to the first prism and disposed in the bore 15 of the panoramic inverting member 14. This inverting member is a tubular glass body, the refracting faces 11 and 16 of which are ground and polished conical sections having an inclination of 45°. The polished inside surface 15 of the tube has a mirror coating and acts as a reflecting base.

The entire field of view 2 of the optical system is a rotation-symmetrical space 2 having a center angle of 360° at the center of the shperical optical element 5. The field of view of the straight-view optical means cover about 90° of the vertical angle of view whereas about 210° are covered by the field of view of the panoramic optical means. This means that the instrument provides for a continuous view not only in a forward direction but also toward all sides and to the rear.

For an explanation of the paths of rays through the entire optical system, the illustrative embodiment is shown with a diagrammatically indicated surface 1, the upper end of which extends into the field of view of the straight-view optical means and the lower end of which extends into the field of view of the panoramic optical means.

When the ray from the upper end has passed through the straight-view optical means, it enters through the image plane 7 the first inverting prism, where it is refracted, reflected at the base of this prism and directed through the optical axis to the second refracting face. Hence, the ray leaves the prism after erection and reaches now the second inverting prism, which is set at an angle of 90° to the first prism, to compensate for the rotation of the image resulting from a rotation of the system, and ensures a fixed angle of inversion of 180°.

The ray from the lower end of the sector 1 enters the body of the panoramic optical means and falls on the image mirror 6, where it is reflected in dependence on the angle of incidence. After leaving the panoramic optical body, the ray falls on the first refracting face 11 of the inverting prism 14 and is reflected at the base of this prism to the second refracting surface 16, through which it leaves the prism after having been erected.

A succeeding, convergent optical system represented by the lens 17 produces the total image in the plane 18. As is indicated at 19, this image is a circular area. The image consists of an area which is defined by an inner circle and includes the straight-view image whereas the adjoining annular image between the inner and outer circles serves to reproduce the panoramic view.

The position of the surface portion 20 corresponds to the surface portion 1 and shows clearly the orthoscopic properties of the optical system.

What is claimed is:

1. An optical system which comprises panoramic optical means defining an optical axis and arranged to receive light which is laterally incident with respect to said axis and to transmit said light in a tubular path along said axis, a tubular inverting member defining a cylindrical cavity and arranged to receive the light thus transmitted around one end of said cavity and to invert said light and emit it around the opposite end of said cavity, and straight-view optical means comprising a first inverting prism disposed in said path and having a reflecting surface and adapted to receive light which is incident substantially longitudinally of said axis and to emit said light into said one end of said cavity, and a second inverting prism disposed in said cavity and having a reflecting base extending at an angle of 90° to the reflecting base of said first inverting prism and adapted to receive said light emitted into said one end of said cavity and to transmit it out of the other end of said cavity.

2. An optical system as set forth in claim 1, in which said panoramic optical means comprise a body forming said path and defining a cylindrical cavity extending longitudinally of said axis and accommodating said first inverting prism, said body being transparent for the access of said laterally incident light and longitudinally of said axis.

3. An optical system as set forth in claim 2, in which said first inverting prism is carried by said body.

4. An optical system as set forth in claim 1, in which said panoramic optical means comprises a spherical mirror arranged to receive said laterally incident light, to transmit it along said path and to produce a virtual image.

5. An optical system as set forth in claim 1, in which said tubular inverting member has a polished and mirror-coated inside cylindrical surface forming a reflecting base, and axially outwardly tapering, conical end faces having an inclination of 45° and forming refracting faces.

6. An optical system as claimed in claim 1, wherein said panoramic optical means has a panoramic mirror at the front end thereof; and wherein said straight-view optical means comprise a lens located in said axis forwardly of said panoramic mirror.

7. An optical system as claimed in claim 6 wherein said lens is spherical, and said panoramic mirror is a substantially semi-spherical surface located opposite half of the surface of said spherical lens, said spherical lens having an image plane coinciding with the virtual image plane of said panoramic mirror.

8. An optical system according to claim 1 and including image forming means disposed at the front end of said panoramic optical means.

9. An optical system according to claim 1 wherein said panoramic optical means is a tubular body having a cylindrical cavity aligned with said cylindrical cavity in said tubular inverting member, said first inverting prism being located in said cavity of said panoramic optical body; wherein said panoramic optical body has a semi-spherical panoramic mirror surface at the front end thereof; comprising a transparent cover plate at the front end of said panoramic body; and a spherical lens supported in said optical axis by said cover plate and located in said optical axis forwardly of said panoramic mirror for guiding rays toward said first inverting prism.

10. An orthoscopic panoramic and straight-view optical system comprising from the front to the rear along an optical axis, a spherical straight-view lens, a transparent plate supporting said straight-view lens; a panoramic transparent tubular cylindrical body having a first cavity, and a semi-spherical recess at the front end thereof closed by said cover plate, said semi-spherical recess having a panoramic mirror surface; a tubular inverting member having a second cavity aligned with said first cavity, and two outwardly tapering conical end faces having an inclination of 45°, and a mirror coated surface bounding said second cavity and forming a reflecting base; and a second prism located in said cavity, said first and second prisms being inverting prisms.

References Cited

UNITED STATES PATENTS

| | | | |
|---|---|---|---|
| 3,122,602 | 8/1964 | Page | 350—198 |
| 1,616,279 | 2/1927 | Parodi | 350—21 |

JEWELL H. PEDERSEN, *Primary Examiner.*

RONALD L. WIBERT, *Assistant Examiner.*